United States Patent [19]

Tragert

[11] 4,084,616
[45] Apr. 18, 1978

[54] FLUID PROPORTIONING DEVICE

[75] Inventor: William Tragert, Rockville, Md.

[73] Assignee: KTA Corporation, Rockville, Md.

[21] Appl. No.: 728,326

[22] Filed: Sep. 30, 1976

[51] Int. Cl.² ............................................. F16K 11/02
[52] U.S. Cl. ........................... 137/625.4; 251/DIG. 2; 98/38 B
[58] Field of Search .............. 251/DIG. 2; 137/625.4; 98/38 R, 38 B, 38 C

[56] References Cited

U.S. PATENT DOCUMENTS

| 70,511 | 11/1867 | Bourden | 251/DIG. 2 |
| 76,717 | 4/1868 | Crane | 98/38 B |
| 825,064 | 7/1906 | Levey | 137/625.4 X |
| 2,757,868 | 8/1956 | Kreuttner | 98/38 B |
| 3,773,077 | 11/1973 | Barnebey | 251/DIG. 2 |

Primary Examiner—Arnold Rosenthal
Attorney, Agent, or Firm—Beveridge, DeGrandi, Kline & Lunsford

[57] ABSTRACT

A fluid proportioning device which operates in a linear fashion and has a constant-volume output as a function of damper position. A sheet of flexible material is moved against a plate having two groups of apertures which are in respective fluid connection with two fluid streams, the sheet being operative when in a selected position to cover a selected percentage of each group of apertures to apportion the fluid flowing therefrom. The sheet is a flexible foil sheet which is wrapped around two spaced cylindrical members and stretched therebetween, with one portion of the sheet maintained flush against the aperture plate. When the cylindrical members are moved along the plate direction the foil rolls around the members to the desired position.

7 Claims, 3 Drawing Figures

FLUID PROPORTIONING DEVICE

The present invention is directed to a fluid proportioner which operates substantially linearly and which provides a substantially constant-volume output as a function of damper position.

It is frequently necessary to mix fluids coming from different sources, for instance fluids at different temperatures, to provide a composite fluid. One example of this is an application where outside air is mixed with recirculated room air to provide a composite fluid maintained at a set point temperature.

To accomplish this function the prior art has provided fluid proportioning devices of diverse types, but in general these prior art devices have failed to operate in a linear fashion. In particular, these devices suffer from non-linearity at the point where an aperture which has been closed is first opened by a small amount, for example 10%, and another aperture which has been completely opened is closed by the same small amount. In this case, due to the high change in pressure at opening the volume of fluid flowing through the aperture just opened is disproportionately greater than would be indicated by the degree of opening. These devices therefore do not provide a constant volume output from the two apertures as a function of damper position.

It is therefore an object of the invention to provide a fluid proportioner having a constant volume output as a function of damper position.

It is a further object of the invention to provide a device which contains only a few parts and is relatively easy and inexpensive to fabricate.

It is still a further object of the invention to provide a fluid proportioner which is quiet in operation, which consumes a relatively small amount of energy and which is lightweight and durable.

The above objects are accomplished by providing a device in which a sheet of flexible material is moved in relationship to a plate having two groups of apertures which are in fluid connection with two fluid streams, the sheet being operative when in a selected position to cover a selected percentage of each group of apertures to apportion the fluid flowing therefrom. The sheet is a flexible foil sheet which is wrapped around two spaced cylindrical members and stretched therebetween, with one portion of the sheet held flush against the aperture plate. When the cylindrical members are moved along the path the foil rolls around them to the desired position.

The invention will be better understood by referring to the accompanying drawings in which.

Figure 1:
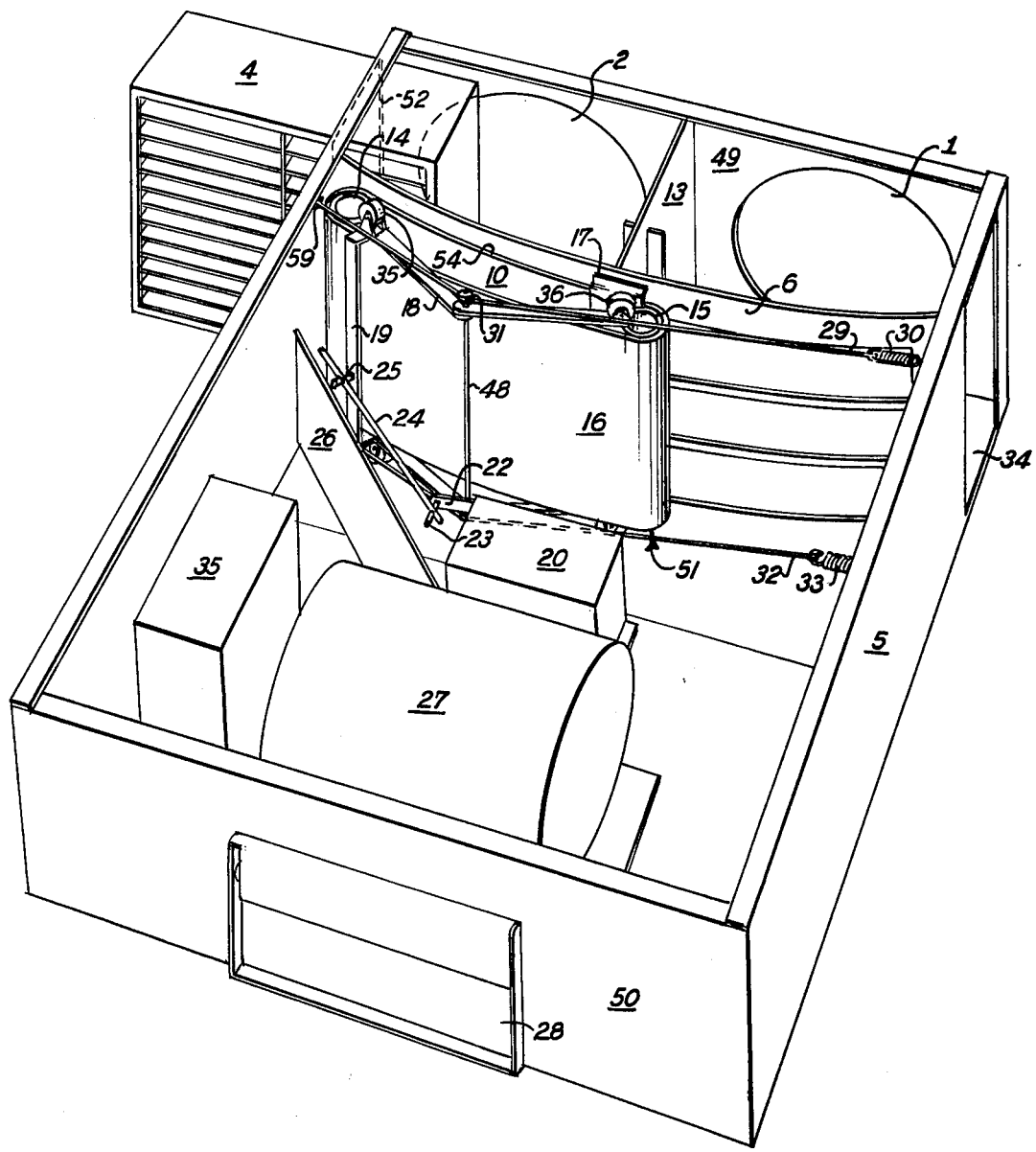
FIG. 1 is a perspective view of an embodiment of a fluid proportioner according to the invention.
Figure 2:
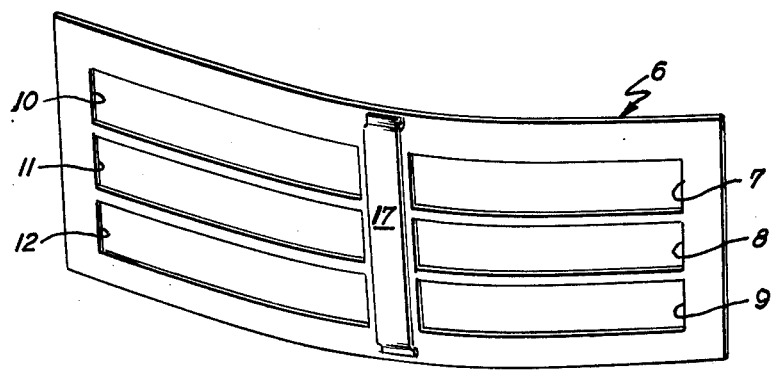
FIG. 2 is a perspective view of the aperture plate of the fluid proportioner of FIG. 1.

Referring to FIG. 1, a perspective view of an embodiment of the fluid proportioner device of the invention is shown. The proportioner is housed in enclosure 5 having front plate 49 which has fluid entrance ports 1 and 2 therein, and rear plate 50 which has exit port 28 therein. Aperture plate 6 is disposed behind front plate 49 and as shown in greater detail in FIG. 2 has apertures 7, 8 and 9 on one side thereof and apertures 10, 11 and 12 on the other side thereof. The aperture plate is curved slightly in the direction perpendicular to the fluid flow direction, and fluid divider plate 13 extends from the center of the rear of front plate 49 to the front of aperture plate 6, and bisects both plates. While ports 1 and 2 have been shown as being circular and while port 28 and apertures 7 to 12 have been shown as being rectangular, it is to be understood that these openings may assume a variety of shapes, which are within the scope of the present invention.

Further, in the illustrated embodiment enclosure 5 has side openings 34 and 52, respectively, in which air filters are disposed and one such filter 4 which fits into opening 52 is shown in the drawing.

Slidable assembly 51 is disposed immediately behind aperture plate 6. This assembly is shown more clearly in FIG. 3 and is seen to comprise two rigid cylindrical members 14 and 15 spaced apart by a frame comprised of members 41, 42, 43, 44 ad 48. Members 40, 41, 42 and 43 are secured to the cylindrical members, which in the illustrated embodiment are tubes, at least at the top and bottom of the tubes by any conventional securing means, and two such means are denoted by 44 and 45 in FIG. 3. Support members 40 and 41 are non-movably secured to each other at 53 and members 42 and 43 are non-movably secured to each other at 55, rod 48 connecting junctions 54 and 55. Grooved wheel 31 is secured near the top of rod 48, and wheels 35 and 36 are fastened to members 41 and 40, respectively, while wheels 46 and 47 are fastened to members 43 and 42, respectively.

Figure 3:
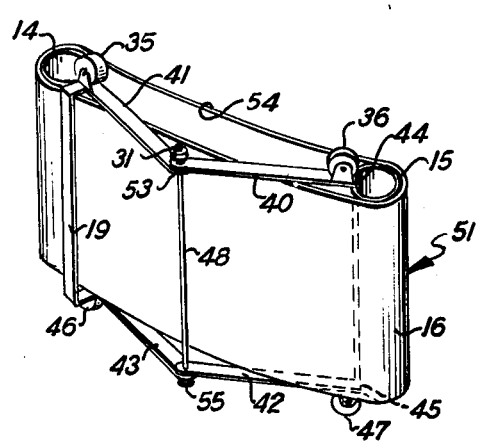
FIG. 3 is a perspective view of the slidable assembly of the proportioner of FIG. 1.

Flexible sheet 16 is tightly wrapped around cylindrical members 14 and 15 as is shown in FIG. 3. While in the preferred embodiment of the invention the flexible sheet is comprised of 0.007-inch stainless steel foil, it is to be understood that other flexible sheet materials may be used. Referring to FIG. 1, slidable assembly 51 is made just wide enoughs that when the assembly is displaced all the way to one side of the aperture plate the front portion 54 of the flexible sheet can completely cover only one of the groups of apertures. The assembly 51 is mounted in enclosure 5 so that the sheet front portion 54 is flush against the rear of aperture plate 6. Aperture plate 6 has a vertically extending flat strip member 17 secured thereto and disposed between the two groups of apertures. A vertically extending strip of the flexible sheet is fixedly secured between strip 17 and aperture plate 6 so that it cannot move with respect to the aperture plate.

Additionally, filamentary tensioning means 29 and 32, which for instance may be wires, are secured to springs 30 and 33, respectively, at one side of the housing and extend over to the other side of the housing where they are secured by conventional means such as 59 shown in FIG. 1. Top tensioning means 29 engages grooved wheel 31 attached to rod 48 and the bottom tensioning means 32 engages a similar grooved wheel, not shown. The tensioning means are thus effective to urge the front part of the flexible sheet against the aperture plate.

As the assembly 51 is moved from left to right in FIG. 1, flexible sheet 16 rolls around the cylindrical members in the counter-clockwise direction so that apertures 7, 8 and 9 start becoming covered by the sheet while apertures 10, 11 and 12 start becoming uncovered. As is apparent, apertures 10, 11 and 12 will become uncovered to the same degree that apertures 7, 8 and 9 become covered. If assembly 51 is moved all the way to the right of the enclosure, then apertures 7, 8 and 9 will become completely covered while apertures 10, 11 and 12 will become completely uncovered. The movement of assembly 51 may be stopped at any selected point to provide a selected proportioning of the covered aperture areas of the two groups.

Assembly 51 is moved by actuator motor means 20 operating through linkages 22 and 24 and universal joints 23 and 25, operative to transmit the required force to bracket 19 of assembly 51. Alternatively, any known mechanical arrangement may be used to provide the required motion.

In the operation of the device, ports 1 and 2 are connected to different fluid sources, for instance air at different temperatures. Centrifugal blower 27 draws air through the proportioner and a control system including a thermostat which for instance can be located in a duct, controls motor means 20 to move slidable assembly 51 to a proportioning position effective to cause proper volumes of air at different temperatures to be drawn through the two aperture groups, and out of the proportioner through exit port 28.

Thus, a proportioner has been described in which a constant volume fluid output is obtained at all positions of the slidable assembly. Further, while I have described and illustrated an embodiment of my invention, I wish it to be understood that I do not intend to be restricted solely thereto, but that I do intent to cover all modifications thereof which would be apparent to one skilled in the art and which come within the spirit and scope of my invention.

What is claimed is:

1. A substantially linearly operating fluid proportioner comprising, an enclosure having a first port therein, and having as a part a curved plate having two mutually exclusive aperture areas in fluid connection with said first port, each of said aperture areas having at least one aperture, a sheet of flexible material, means for mounting said sheet so that at least a part of it is flush against said plate, said at least a part being large enough to completely overlie only one of said aperture areas, and means for moving said sheet while keeping a part of it flush against said plate to overlie selected respective percentages of said two aperture areas and for stopping said sheet at a selected position, said sheet of flexible material being mounted on an assembly which is moved by said means for moving in the direction of curvature of said curved plate, said assembly comprising two cylindrical members and at least a rigid spacing member connecting them, said assembly being mounted so that the axial direction of said cylindrical members is perpendicular to the direction of movement thereof, and said sheet of flexible material being wrapped around said cylindrical members so that two parallel surfaces of said sheet spaced from each other by approximately the outside diameter of said cylindrical members extend in the region between said two cylindrical members, and means for preventing said sheet from moving relative to said plate at a region between said aperture areas.

2. The fluid proportioner of claim 1 wherein each of said aperture areas is in part bounded by two parallel lines which are parallel to the direction of movement of said assembly and wherein the parallel lines bounding respective parts of said two aperture areas are co-linear.

3. The fluid proportioner of claim 1 further including tensioning means for positioning said assembly so that a part of said sheet is kept flush against said plate.

4. The fluid proportioner of claim 1 wherein said means for moving comprises motor means and linkage means connecting said motor and said assembly.

5. The fluid proportioner of claim 1 wherein said enclosure includes a member having second and third ports therein, each of said second and third ports being located directly in front of said aperture areas, and a rigid fluid divider member extending from said plate at a position between said two aperture areas to said member at a position between said second and third ports.

6. The fluid proportioner of claim 1 wherein each aperture is rectangular in shape and has its long dimension in the direction of movement of said sheet.

7. The fluid proportioner of claim 6 wherein said aperture areas are identical.

* * * * *